Nov. 20, 1928.                                             1,692,575
W. D. ROOT
CORN POPPING MACHINE
Filed May 19, 1927                        4 Sheets-Sheet 1

Inventor
William D. Root
Knox Hudson & Kent attys

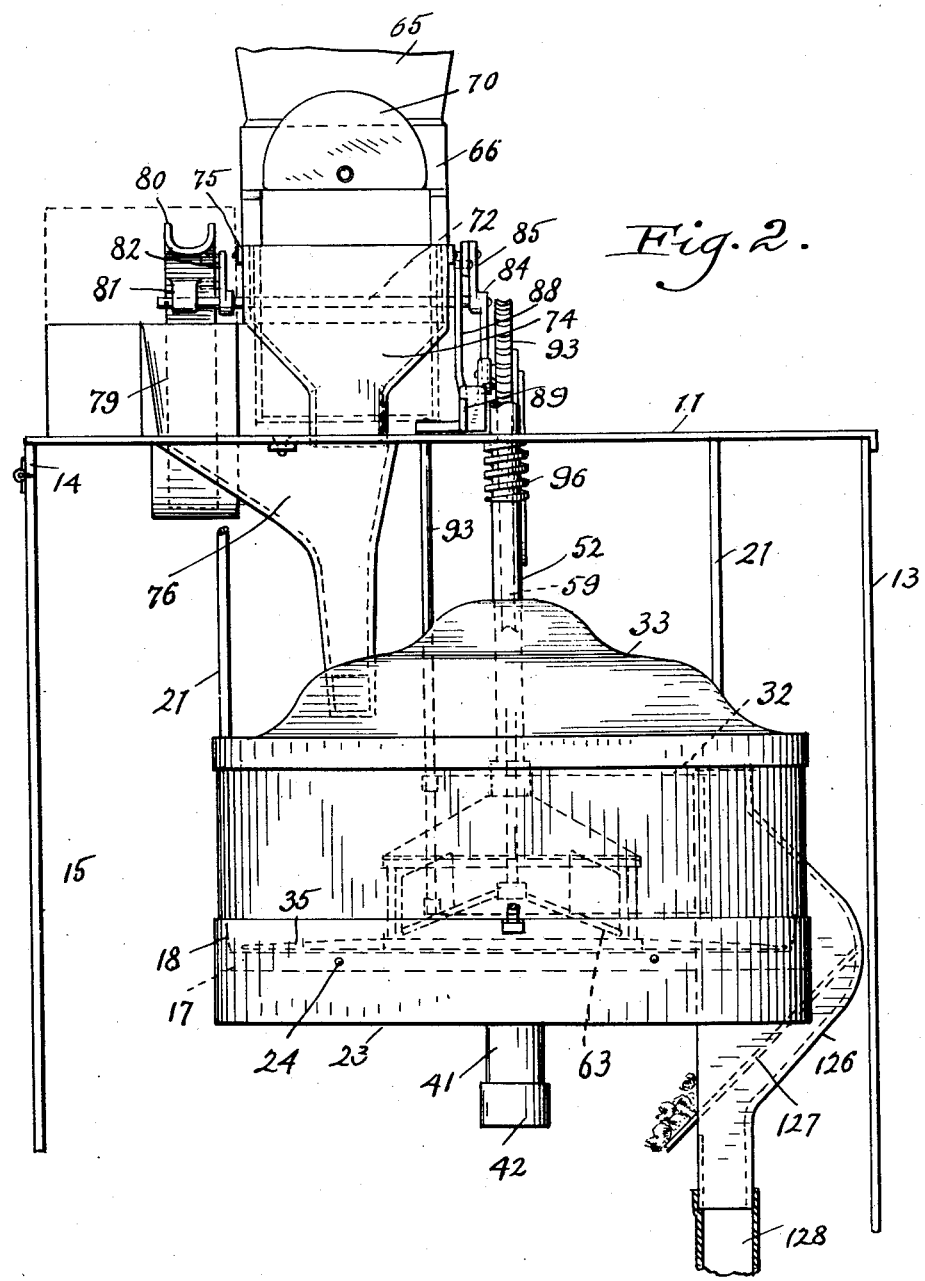

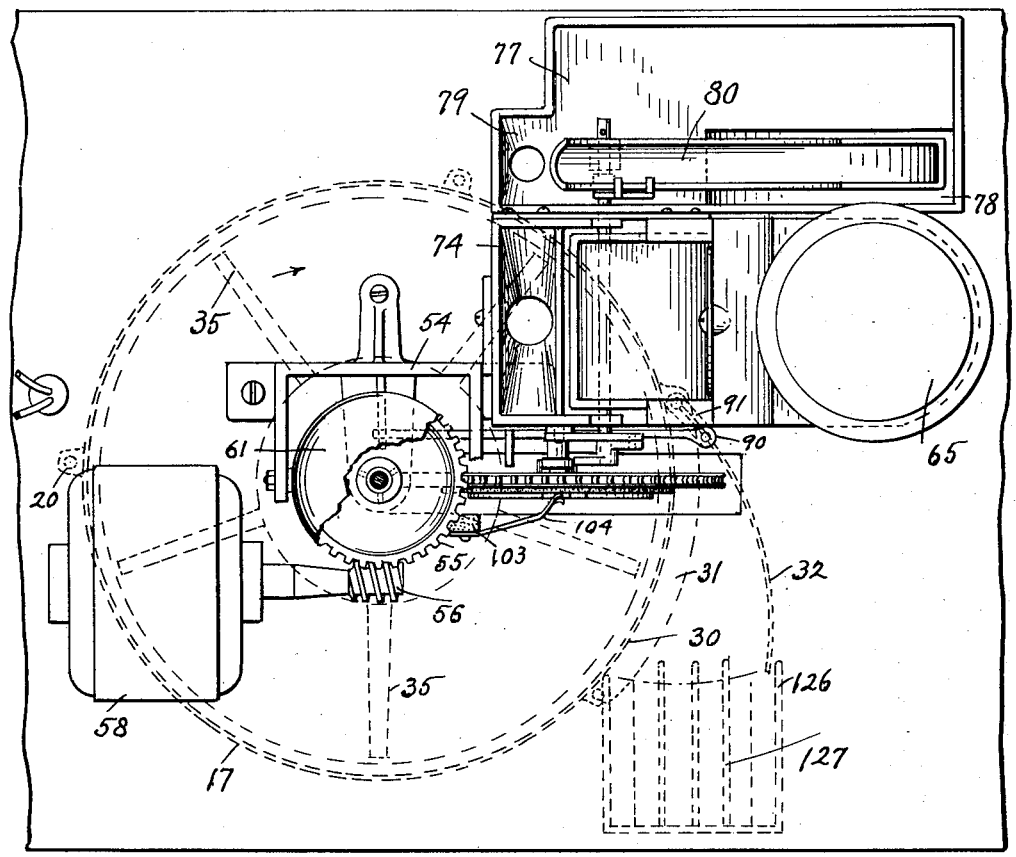
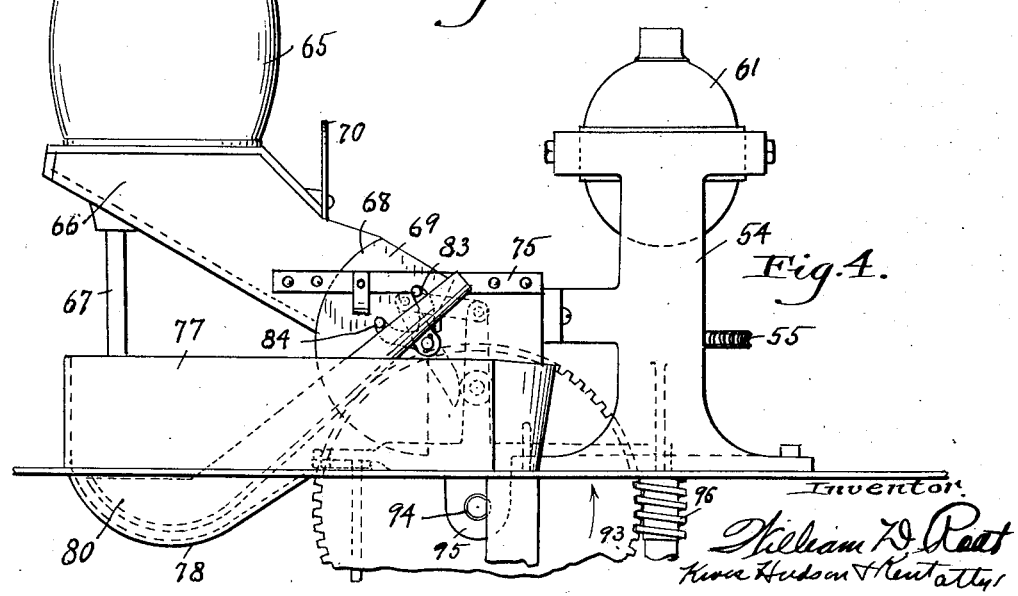

Nov. 20, 1928.
W. D. ROOT
1,692,575
CORN POPPING MACHINE
Filed May 19, 1927 4 Sheets-Sheet 4
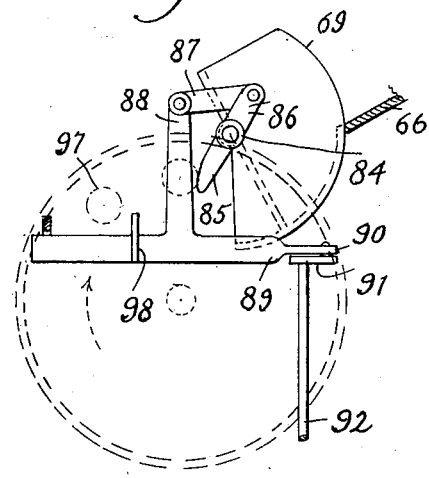
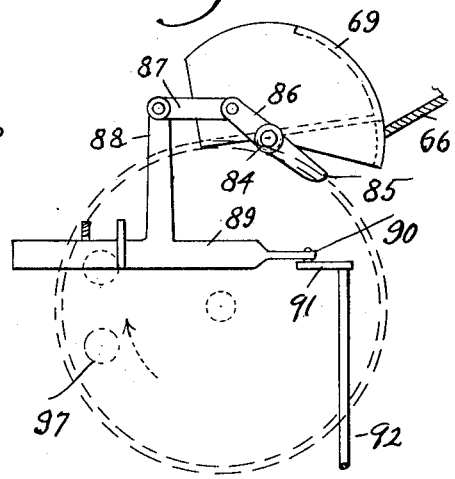
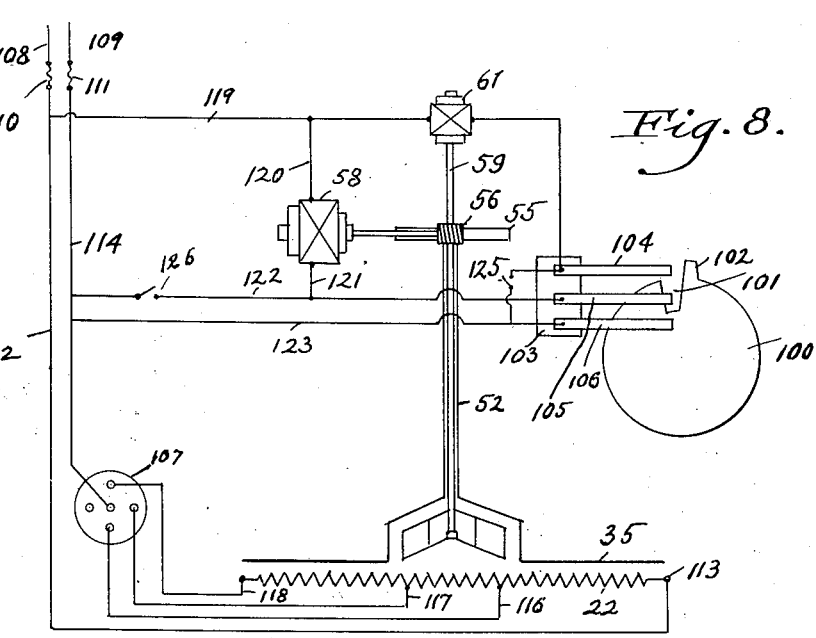
Inventor
William D. Root
Kwis Hudson & Kent attys Patented Nov. 20, 1928.

1,692,575

UNITED STATES PATENT OFFICE.

WILLIAM D. ROOT, OF CLEVELAND, OHIO.

CORN-POPPING MACHINE.

Application filed May 19, 1927. Serial No. 192,699.

This invention relates to corn popping machines and particularly to an automatically operated machine, wherein the unpopped corn is fed into a popping chamber and therein popped and finally discharged, which operation constitutes a complete cycle of operations.

It is a further object of the invention to provide a means whereby the unpopped corn and the seasoning are brought into contact previous to their introduction into the popping chamber, which results in an improved quality of popped corn as compared with the popped corn produced by the types of machines now employed.

A further object of the invention resides in the provision of a specially designed heating plate and means in combination therewith, whereby the unpopped corn delivered to the heating plate in the popping chamber is thoroughly agitated during the popping operation, which agitation causes the unpopped grains of corn to be turned over and over so that the heat transmitted to the heating plate more quickly results in the popping of the grains of corn.

A further object of the invention is to provide a heater plate for heating the popped corn, provided with a circumferentially extending flange adapted to maintain the seasoning fluid upon the heater plate.

A still further object of the invention resides in the provision of means for automatically discharging the popped corn within the popping chamber which means is actuated upon the completion of the cycle of operations after the corn has been thoroughly popped.

A further object of the invention is to provide an automatic means whereby a quantity of unpopped corn is measured and mixed with the seasoning prior to its introduction into the popping chamber, introducing the unpopped corn into the popping chamber in contact with a horizontally disposed heating plate which is heated by the usual type of heating element, agitating the corn while the same is being popped and causing the popped corn to be discharged by means of a rotary fan, each of these operations being properly timed and constituting a complete cycle of operations.

Another object of the invention is to provide means whereby the popped corn can be readily and efficiently separated from the unpopped grains of corn after the same have been discharged from the popping chamber.

A final object of the invention is to provide a machine of the type referred to which is efficient and simple in operation and exceptionally inexpensive to manufacture as compared with automatic machines now manufactured and used.

With the objects above indicated and other objects hereinafter explained in view, the invention consists in the construction and combination of elements hereinafter described and claimed.

Referring to the drawings:

Figure 2 is a front elevational view looking into the machine from the left of Figure 1.

Figure 3 is a top plan view of the machine showing the various arrangements of the parts.

Figure 4 is a fragmentary portion of the machine looking inwardly from the side opposite to that shown in Figure 1.

Figure 6 is a detail view of the unpopped corn measuring member and the mechanism for operating the same.

Figure 7 is a detail view similar to that shown in Figure 6, but showing the measuring member in its discharging position.

Figure 8 is a diagrammatic view of the circuit employed in connection with the operation of the machine.

Figures 1, 5:
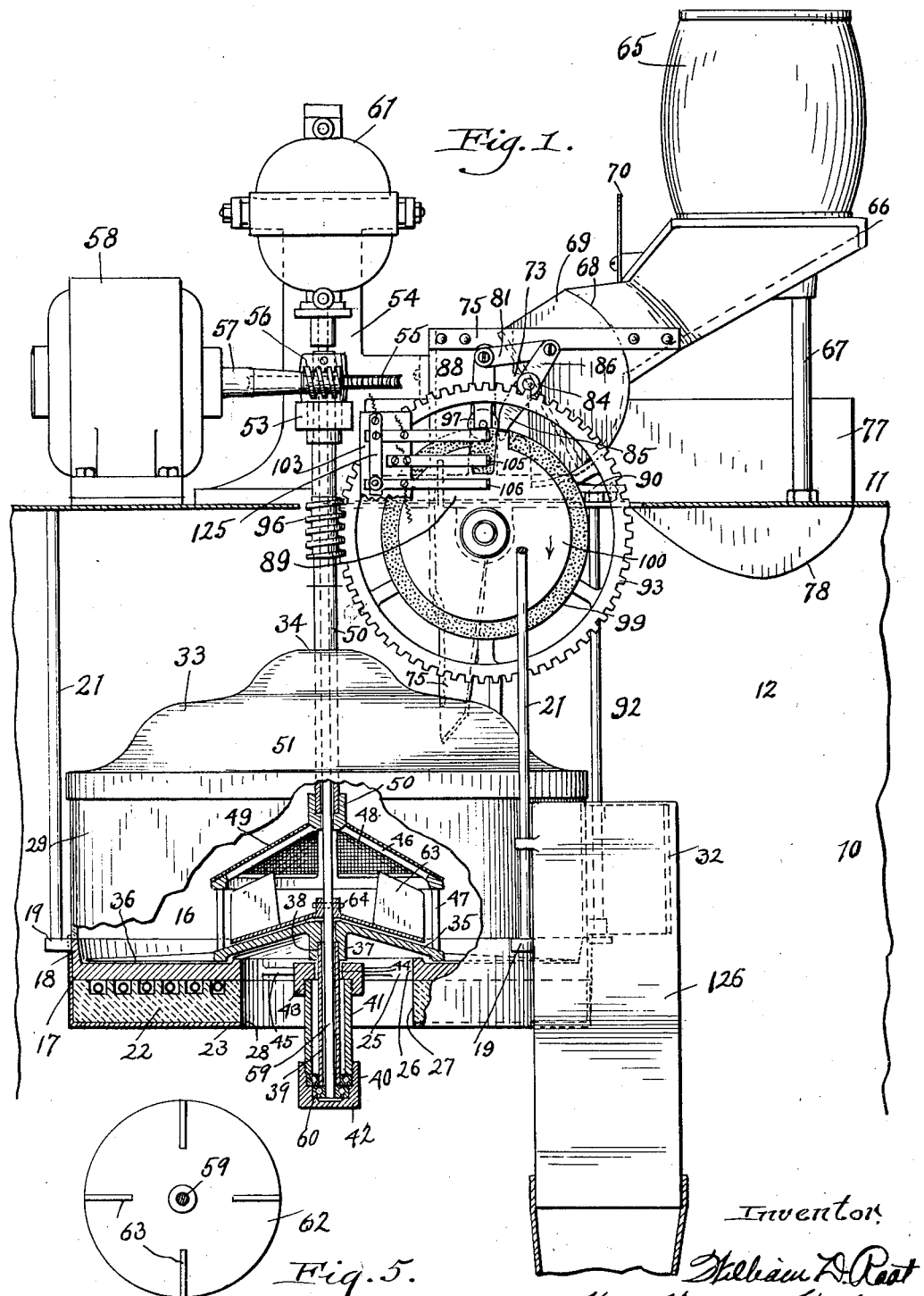
Figure 1 is a side elevational view, partly in section, showing the general arrangement of the various elements.
Figure 5 is a top plan view of the fan employed for discharging the popped corn from the popping chamber.

In the drawings, 10 represents a closure or cabinet of the corn popping machine and consists of a top 11. side members 12, a rear member 13, and a front member 14, all suitably joined together to form a cabinet of any desirable shape. The front of the cabinet 11 is provided with an outwardly swinging door 15 pivoted near the upper portion of the front member 14 and is provided so that the popped corn can readily be removed from within the cabinet when desired.

A popping chamber 16 is properly positioned within the cabinet 10 and comprises a horizontally disposed heating or popping plate 17 which has an upwardly extending annular flange 18 extending circumferentially thereof. At spaced intervals around the outer surface of the flange 18 are a plurality of radially extending lugs 19, each of which is provided with a screw-threaded opening 20 receiving the screw-threaded ends of vertically extending rods 21, the opposite upper ends of which are secured by suitable means to the top 11 of the cabinet 10. In this manner the popping chamber 16 is rigidly supported in the desired horizontal position within the cabinet 10.

A heating element 22 is positioned in contact with the under side of the heating plate 17 and held in engagement therewith by a cup-shaped member 23, the side walls of which entirely enclose the heating element 22 and the heating plate 17, and is attached to the latter by a plurality of screws 24 or any other suitable means.

The central portion of the heating plate 17 is provided with a suitable vertical opening 25, and surrounding the opening upon the upper surface of the heating plate 17 is a circumferentially extending flange 26. It will be here noted that openings 27 and 28 are provided in the heating element 22 and the cup-shaped member 23 respectively, similar to the opening 25 and in alignment therewith, which openings form a centrally extending unobstructed passageway, the purpose of which will be hereinafter explained.

The popping chamber 16 is further provided preferably with a glass wall 29 of material such as pyrex or other similar heat resisting material, and has its lower edge conforming in shape to the shape of the flange 18 of the heating plate 17 and is supported thereby. The glass wall 29 is maintained in position by the side wall of the cup-shaped members 23 and is provided with a discharge opening 30 through which the popped corn can be discharged by a suitable mechanism which will be later described.

The heating plate 17 is provided with a lip or lateral extension 31 adjacent the opening 30 in the glass wall 29 and at one end of this lip 31 is pivoted a closure member or door 32 which is adapted to be closed while the corn is being popped, but which can be opened when the corn has been popped so that the corn may be discharged therethrough to empty the popping chamber 16 and render the same in condition to receive and pop a new supply of unpopped corn. A suitable cover 33 is placed upon the glass wall 29 and is provided with a central opening 34.

It is desirable to provide means for agitating the grains of corn during the popping operation and I have shown herein the preferable arrangement. Within the popping chamber 16 is rotatably mounted a dome-shaped member 35 of sufficient diameter to extend beyond the flange 25 of the heating plate 17, and integral with the dome-shaped member 35 are a plurality of radially extending arms 36 which terminate adjacent the flange 18 of the heating plate 17. These arms 36 are positioned just out of engagement with the upper surface of the heating plate 17 but sufficiently close thereto to cause the grains of unpopped corn to be agitated during the popping operation.

The dome-shaped member 35 is further provided with a depending hub 37 through which extends an opening 38 into which is force-fitted a depending tubular member 39 having its lower end supported in a ball race 40 to assure free and easy rotation thereof. Enclosing the tubular member 39 is a cylindrical housing 41 which is exteriorly screw-threaded at both ends, the lower end receiving a screw-threaded cap 42 in which is supported the ball race 40. The upper end of the housing 41 is screw-threaded into a centrally disposed cylindrical member 43 having a central opening 44 through which the tubular member 39 is free to rotate and which is connected by a plurality of integral arms 45 to the inner wall of the heating plate 17.

Concentrically above the dome-shaped member 35 is a second dome-shaped member 46 secured together by a plurality of upwardly extending rods 47 and the member 46 is provided with openings 48 which are covered by the screen 49, the purpose of which will be later described. At the apex of the dome-shaped member 46 is an upwardly extending hub 50 formed integrally therewith and provided with a central opening 51 into which is force-fitted a tubular shaft 52 which extends upwardly through the opening 34 in the cover 33. The upper end of the tubular shaft 52 extends through the top 11 of the cabinet 10 and is journalled for rotation in a bearing 53 forming a part of the motor supporting casting 54, which latter casting is suitably secured to the top 11 of the cabinet 10. Pinned or keyed to the end of the tubular shaft 52 is a horizontally disposed gear 55 with which meshes a worm gear 56 on the end of a shaft 57 of the motor 58 and upon actuation of the motor the agitating arms 36 are rotated for stirring up the corn in the popping chamber 16 during the popping operation.

Extending centrally of the tubular shaft 52 is a shaft or rod 59 of lesser diameter which has its lowermost end supported in a ball race 60 positioned beneath the ball race 40 and also positioned in the cap 42. The upper end of the rod 59 is suitably connected to the motor 61 adjustably mounted upon the casting 54, which motor will be termed the fan motor.

Disposed in the space between the two dome-shaped members 35 and 46 is a circular plate 62 provided with a plurality of upwardly extending vanes 63, which plate 62 is secured at 64 to the rod 59 so that the former may be freely rotated by the fan motor 61 at predetermined intervals for blowing the popped corn out through the opening 30 in a manner to be later described. Four of the vanes 63 are here shown but it should be understood that any number may be provided and that the shape may be changed from that shown in the drawings if desirable.

It is essential, of course, that the unpopped corn be supplied to the popping chamber 16, and as the machine herein described is of the automatic type, the preferred feeding mechanism is described. A receptacle or container 65 for holding the grains of unpopped corn is mounted upon a member 66 which is supported by the rod 67 secured to the top 11 of the cabinet 10. This member 16 acts as a chute for the corn and the lower end is cut away at 68 to cooperate with a measuring member 69 adapted to receive a quantity of unpopped corn and through suitable means deliver it to the popping chamber 16. A regulator 70 may be pivoted to the front of the member 66 and be rotated into engagement with the corn and thereby regulate the flow of corn from the container 65 to the measuring member 69.

This measuring member 69 is provided upon its under surface with a pair of depending ears 71 having openings in which is secured a transverse shaft 72, the ends of which are rotatably mounted in extensions 73 formed upon the sides of the funnel 74 which latter is supported in upright position by the side bars 75 riveted thereto and to the member 66 in suitable position to receive the unpopped corn discharged from the measuring member 69. This funnel 74 extends through an opening in the top 11 of the cabinet 10 and communicates with a second funnel 76 bolted to the under side of the top 11, the discharge nozzle of which extends downwardly through a suitable opening in the cover 33 of the popping chamber 16.

It is advisable to provide a means for supplying butter to the popped corn, and from actual experimenting I have found that it is much more desirable to apply the seasoning to the grains of unpopped corn in passing into the popping chamber with the result that the popped corn is very greatly improved.

The arrangement herein disclosed is therefore preferable although various changes may be made without departing from the invention.

A butter container or receptacle 77 is suitably mounted on the top 11 of the cabinet 10 and is provided with a depressed portion 78. The end opposite the depressed portion is provided with a funnel-shaped portion 79, the opening in which is adapted to communicate with the upper portion of the funnel 76, as clearly shown in Fig. 2.

A measuring scoop 80 is disposed in the container 77 and has its lower portion formed to fit within the depressed portion 78 and to contain a measured quantity of butter, while its opposite end has formed integrally therewith a depending lug 81 which is pivotally connected to one end of the transverse shaft 72. A bifurcated member 82 is rigidly secured to the shaft 72 between the measuring member 69 and the measuring scoop 80 and has a pair of pins 83 and 84 extending outwardly into engagement with the top edge of the scoop 80 and adapted upon oscillation of the shaft to move the scoop 80 to a position in which the butter contained in the scoop 80 is emptied into the funnel portion 79 and subsequently into the funnel 76, where it mixes with the unpopped corn in passing to the popping chamber.

On the opposite end of the transverse shaft 72 is rigidly fastened an arm 84 which has a depending free end 85 and an upwardly extending portion 86, the latter being pivotally connected to one end of a link 87 while the opposite end of the link is pivotally connected to an upwardly extending arm 88. This latter arm is formed integrally with a horizontal slide member 89 slidably engaging the top 11 of the cabinet 10.

As heretofore described, the popping chamber 16 is provided with a pivoted door 32 through which the popped corn is discharged. However, it is desirable to have this door 32 closed during the popping operation but to be automatically opened at the completion of the popping operation and, at the same time, a new charge of unpopped corn should be supplied to the popping chamber after the popped corn is fully discharged. One end of the slide member 89 is therefore provided with an extension 90 to which is pivotally connected one end of a link 91, the other end being rigidly connected to a vertically extending rod 92 journalled in the top 11 and which at its lower end is fixed to the door closure 32 and pivoted in the lip 31. As the slide member 89 is moved forwardly, the door closure 32 is opened by rotation of the rod 92, and when the slide 89 is moved in the opposite direction, the door closure 32 will be closed.

As a means for actuating this link mechanism, a gear wheel 93 is journalled at 94 in a bearing 95 secured to the cabinet 10 and this gear meshes with a worm 96 either secured to or formed integrally with the tubular shaft 52. This gear wheel 93 carries a roller 97 which, when the gear wheel is rotated, is adapted to engage the free end 85 of the arm 84 and move the same in the direction of rotation of the gear wheel 93. This movement causes the slide 89 to be moved in the opposite direction which partially rotates the rod 92 and closes the door closure 32. Simultaneously, with this action, the corn measuring member 69 is rotated about the axis of the transverse shaft 72 until the corn is emptied into the funnel 76. The rotation of the transverse shaft 72 at the same time causes the scoop 80 to be moved about the axis of the shaft and the butter contained therein is emptied into the funnel 79. Both the butter and the corn then pass downwardly by gravity into the funnel 76 where they mix with each other on their way to the popping chamber.

When the gear wheel 93 has made almost a complete revolution, the roller 97 engages an extension 98 formed integrally with the slide 89 and the latter is moved forwardly with further rotation of the gear wheel 93, thereby returning the corn measuring member 69 and butter scoop 80 to their normal position, and simultaneously opens the door closure 32 by the actuation of the rod 92.

For controlling the operation of the various mechanisms, the gear wheel 93 carries upon its face an insulating disk 99 upon which is secured a flat metallic disk 100. This metallic disk is provided with a recess 101 and a radial extension 102 for a purpose later described.

An insulating block 103 is secured to the top 11 of the cabinet 10 and has bolted thereto a plurality of horizontally disposed contact fingers 104, 105 and 106 respectively. The contact finger 104 is adapted to engage the extension 102 when the gear wheel 93 is rotated and a circuit is closed during this engagement which controls the operation of the fan motor 61. The contact finger 105 is adapted to engage the metallic disk 100 continuously during rotation of the gear wheel 93 closing a circuit and the latter being broken only when the contact finger 105 engages the recess 102. This contact finger controls the operation of the drive motor 58. The contact finger 106 engages the metallic disk 100 at all times during the rotation of the gear wheel 93 and this contact finger 106 is connected to the supply current.

Referring more particularly to the wiring diagram shown in Fig. 8, the operation of the machine will be more readily understood. The conductors 108 and 109 lead to the main source of current supply and are connected to a pair of fuses 110 and 111. Leading from the fuse 110 is a conductor wire 112 which is connected to the end of the heating element 22 at 113. A second conductor wire 114 is conducted to the fuse 111 and also to the heating element control switch 107. The heating element 22 is tapped at 115, 116 and 117, and these conductor wires are suitably connected to the contact points on the control switch 107 so that the heat of the heating element 22 can be controlled.

A conductor wire 119 is connected to the wire 112 and further connected to the terminal of the fan motor 61. A wire 120 connects the wire 119 to one terminal of the main drive motor 58 and the opposite terminal of the main drive motor is connected by wire 121 to the conductor wire 122, one end of which is connected to the wire 114 through motor control switch 129, while the opposite end is connected to the contact finger 105. A conductor wire 123 is connected to the wire 114 and to the contact finger 106 engaging the metallic disk 100. A switch 125 may be bridged across the contact fingers 104 and 106 so that when the switch 125 is manually closed the fan motor 61 will be actuated independently to blow out any corn remaining within the popping chamber which was not completely blown out by the fan at the completion of the cycle of operations.

It is believed that the operation of the corn popping machine will be readily understood from the foregoing description so that only a brief description will be hereafter given.

We will assume now that it is desired to begin the operation of the corn popping machine and that the operating parts assume the relative position shown in Fig. 1.

The current to the motor 58 is turned on which rotates the worm gear 56 meshing with the gear 55 secured to the tubular shaft 52 and as the lower portion of this shaft is secured to the agitating arms 36, the latter are thereby rotated to agitate the corn during the popping operation. Simultaneously upon the rotation of the tubular member 52 the worm 96 being in mesh with the gear wheel 93 causes the latter to be rotated in a clockwise direction and the roller 97 engages the end portion 85 of the arm 84 moving the same forwardly, which movement simultaneously causes the door 32 to be closed, and the measuring member 69 and the scoop 80 to be moved about the axis of the transverse shaft 72 to thereby empty the grains of unpopped corn and seasoning into their respective funnels, the same being mixed together in the funnel 76 which delivers the grains of unpopped corn to the popping chamber 16, where they are vigorously agitated by the rotation of the agitating arms 36. It should be understood, of course, that the heating element has been turned on previous to this operation and that the desired amount of heat is being supplied to the popping chamber and controlled by the switch 107. This agitating continues for a predetermined period of time which is controlled by contact of the contacting finger 105 with the metallic disk 100. During rotation of the metallic disk 100 it will be noted that the contact finger 104 is out of engagement with any portion thereof and consequently the fan motor is rendered inoperative but upon substantially a complete revolution of the metallic disk 100 the contacting finger 104 engages for a predetermined period with the extension 102 thereby closing the circuit to the fan motor which actuates the fan within the popping chamber 62 to discharge the popped corn from therein. A little prior to the actuation of this fan 62 the door 32 of the popping chamber has been moved to open position by engagement of the roller 97 with the extension formed integrally with the slide 89, thereby moving the latter in the direction of rotation of the gear wheel 93 until the measuring member 68 and the scoop 80 have been returned to their normal position to receive the unpopped grains of corn and a new supply of butter respectively. The machine is so constructed that even if the current to the motor 58 should be shut off the cycle of operations will be completed because of the contact between the finger 106 and the metallic disk 100. If it should happen that the popped corn was not completely discharged from the interior of the popping chamber, the switch 125 can be manually closed, thereby closing the circuit to the fan motor for further rotating the fan 62, and this rotation will continue so long as the switch member 125 is maintained in contact with the contacting finger 106.

It so happens that because of the characteristic of the grains of corn some of the latter will not pop sufficiently to be eatable, and I, therefore, provide a means for separating the popped corn from the unpopped corn as the same is blown from the popping chamber through the door 32. This means consists of a U-shaped casting 126 secured adjacent the door opening 30 and provided with a plurality of parallel spaced rods 127 secured to the rear portion of the U-shaped members 126 and extending downwardly at an incline. These rods are spaced so that the unpopped grains of corn can freely pass therebetween while the popped corn engages the upper surfaces of the rods and slides downwardly into the lower portion of the cabinet 10 while the unpopped grains of corn which fall between the rods can be deposited in a suitable receptacle 128.

While I have herein described the preferred arrangement and construction of elements, it is to be understood that certain modifications may be made thereto without departing from the spirit of the invention as set forth in the appended claims.

Having thus described my invention, I claim:

1. In a corn popping machine, a popping chamber, and pneumatic means within said chamber for discharging the corn.

2. In a corn popping machine, a popping chamber, a discharge opening therein, a closure member for said opening, and pneumatic means for discharging the corn through said opening.

3. In a corn popping machine, a popping chamber, a discharge opening therein, a closure member for said opening, and pneumatic means within said chamber for discharging the corn through said opening.

4. In a corn popping machine, a popping chamber, a discharge opening therein, a closure member for said opening, and rotatable means within said chamber for blowing the corn through said opening.

5. In a corn popping machine, a popping chamber, a discharge opening therein, a pivoted closure member for said opening, means for actuating said closure member, and pneumatic means for discharging the corn through said opening.

6. In a corn popping machine, a popping chamber, a discharge opening therein, a closure member for said opening, means for agitating the corn within said chamber, and means for discharging said corn through said opening.

7. In a corn popping machine, a popping chamber, a discharge opening therein, a closure member for said opening, means for actuating said closure member, an agitator for the corn within said chamber, means for actuating said agitator, and means within said chamber for discharging the corn through said opening.

8. In a corn popping machine, a popping chamber, a discharge opening therein, a pivoted closure member for said opening, means for actuating said closure member, a rotatable agitator for said corn within said chamber, means for rotating said agitator, and rotatable means within said chamber adapted to discharge the corn through said opening.

9. In a corn popping machine, a popping chamber, a discharge opening therein, a pivoted closure member for said opening, means for actuating said closure member, a rotatable agitator for said corn within said chamber, means for rotating said agitator, and rotatable means concentric with said agitator within said chamber adapted to discharge the corn through said opening.

10. In a corn popping machine, a popping chamber provided with a horizontally disposed heating plate upon which the corn is adapted to be popped, a discharge opening in said chamber, a closure member for said opening, agitating means rotatably positioned adjacent said plate, and rotatable means within said chamber adapted to discharge the corn.

11. In a corn popping machine, a popping chamber provided with a horizontally disposed heating plate, a heating element associated with said plate and adapted to heat the same, an agitating member rotatably mounted in said chamber, a discharge opening in said chamber, a pivoted closure member therefor, actuating means for said closure member adapted to open and close said closure member at predetermined intervals, and means rotatably mounted in said chamber concentric with said agitating member adapted to discharge said corn through said opening when said closure member is in open position.

12. In a corn popping machine, a popping chamber, a discharge opening therein, a closure member for said opening, actuating means for said closure member, pneumatic means within said popping chamber adapted to discharge the corn, and means for separating the popped corn from the unpopped corn.

13. In a corn popping machine, a popping chamber, a discharge opening therein, a closure member for said opening, means for actuating said closure member at predetermined intervals, and a fan rotatably mounted in said popping chamber adapted to be rotated when said closure member is opened to cause the corn to be discharged from within said chamber.

14. In a corn popping machine, a popping chamber, a discharge opening therein, a closure member for said opening, means for actuating said closure member at predetermined intervals, agitating means within said popping chamber, and a fan rotatably mounted in said popping chamber adapted to be rotated when said closure member is opened to cause the corn to be discharged from within said chamber.

15. In a corn popping machine, a popping chamber, a discharge opening therein, a closure member for said opening, means for actuating said closure member at predetermined intervals, agitating means provided with a plurality of radially extending fingers rotatably mounted in said popping chamber, and a fan rotatably mounted in said popping chamber adapted to be rotated when said closure member is opened to cause the corn to be discharged from within said chamber.

16. In a corn popping machine, a popping chamber, a discharge opening therein, a closure member for said opening adapted to be actuated at predetermined intervals, means for introducing unpopped corn into said chamber, and means within said chamber adapted to cause the popped corn to be discharged through said discharge opening.

17. In a corn popping machine, a popping chamber provided with a heating plate, a heating element associated therewith, a discharge opening in said chamber, a closure member for said opening adapted to be actuated at predetermined intervals, means for introducing unpopped corn into said chamber in contact with said heating plate, means for agitating said corn while in engagement with said plate, and means rotatably mounted in said chamber adapted to be operated to discharge the popped corn through said discharge opening when said closure member is opened.

18. In a corn popping machine, a popping chamber, means for feeding unpopped corn into said chamber, and pneumatic means within said chamber adapted to discharge the popped corn from the latter.

19. In a corn popping machine, a popping chamber, means for feeding unpopped corn into said chamber, means for agitating said corn while being popped, and means within said chamber adapted to discharge the popped corn.

20. In a corn popping machine, a popping chamber, means for feeding unpopped corn into said chamber, means for supplying seasoning to said corn prior to its entering said chamber, means for agitating said corn within said chamber while it is being popped, and means disposed in said chamber adapted to discharge said corn after the latter has been popped.

21. In a corn popping machine, a popping chamber, a heating plate therein, means for heating said plate, means for feeding unpopped corn into said chamber in engagement with said heating plate, means for supplying a predetermined quantity of seasoning to said corn prior to the latter entering said chamber, means within said chamber adapted to agitate said corn while being popped, and means within said chamber adapted to discharge said corn after the latter has been popped.

22. In a corn popping machine, a popping chamber, a horizontally disposed heating plate in said chamber, means for heating said plate, a discharge opening in said chamber, a closure member for said opening, means for actuating said closure member, means for feeding a predetermined quantity of unpopped corn to said chamber, means for supplying a quantity of butter to said corn, means for agitating said corn during the popping thereof, and rotatable means within said casing concentric with respect to said agitator, the said rotatable means being adapted to discharge the popped corn from said chamber.

23. In a corn popping machine, a popping chamber having a horizontally disposed heating plate, means for heating said plate, a discharge opening in said chamber, a closure member for said opening, an agitating member in said chamber, means for actuating said agitating member during the popping of the corn, a rotatable fan disposed in said chamber, and means for actuating said fan to discharge the popped corn from said chamber.

24. In a corn popping machine, a popping chamber having a horizontally disposed heating plate, means for heating said plate, a discharge opening in said chamber, a closure member for said opening, an agitating member in said chamber, means for actuating said agitating member during the popping of the corn, a rotatable fan disposed in said chamber, and means for actuating said fan to discharge the popped corn from said chamber substantially simultaneously with the opening of said closure member.

25. In a corn popping machine, a popping chamber, a heating plate in said chamber, means for heating said plate, an inlet opening for the unpopped corn, a discharge opening in said chamber for the popped corn, a closure member for said discharge opening, a fan in said chamber for discharging the popped corn, means for rotating said fan, and means for opening said closure member as said fan is actuated.

26. In a corn popping machine, a horizontally disposed popping chamber, a fan disposed in said chamber adapted to discharge the corn from said chamber, and means for actuating said fan.

27. In a corn popping machine, a horizontally disposed popping chamber, a fan disposed in said chamber adapted to discharge the corn from said chamber, means for rotating said fan, and means for controlling the operation of the last mentioned means.

28. In a corn popping machine, a popping chamber provided with a horizontally disposed heating plate, an inlet opening for the unpopped corn, a discharge opening in said chamber for the popped corn, a closure member for said opening, means for actuating said closure member, a rotatable fan in said chamber, means for rotating said fan, and means for controlling the operation of said last mentioned means so that the fan is rotated substantially simultaneously with the opening of said closure member to cause the popped and unpopped corn to be discharged from said chamber.

29. In a corn popping machine, a popping chamber provided with a horizontally disposed heating plate, an inlet opening for the unpopped corn, a discharge opening in said chamber for the popped corn, a closure member for said opening, means for actuating said closure member, an agitating member in said chamber adjacent said plate, means for rotating said agitating member, a rotatable fan in said chamber concentric with said agitating member, means for rotating said fan, and means for controlling the operation of the agitating member, the fan and the closure member so that after the agitating member has been actuated for a predetermined period of time the fan will be rotated substantially simultaneously with the opening of said closure member to thereby cause the popped and unpopped corn to be discharged from said chamber.

30. In a corn popping machine, a heater plate provided with a circumferentially extending flange, a heating element associated with said plate, rotatable means having portions adjacent the heater plate for causing agitation of the corn, means for rotating said actuating means, and a fan for discharging the popped corn and operated periodically.

31. In a corn popping machine, a heater plate provided with inner and outer flange members, agitating means provided with portions extending between said flanges and adjacent the upper surface of said plate, means for actuating said agitating means, a heating element associated with said heater plate, a fan for periodically discharging the popped corn from the heater plate, and means for rotating said fan.

In testimony whereof, I hereunto affix my signature.

WILLIAM D. ROOT.